United States Patent Office 3,470,135
Patented Sept. 30, 1969

3,470,135
PROCESS FOR THE PREPARATION OF POLYACETAL RESIN
Shinichi Ishida, Kunio Sato, Norimasa Fujita, Hiromichi Fukuda, and Kyoichiro Mori, Tokyo, Japan, assignors to Asahi Kasei Kogyo Kabushiki Kaisha, Osaka, Japan, a corporation of Japan
No Drawing. Filed July 6, 1966, Ser. No. 563,029
Claims priority, application Japan, July 8, 1965, 40/40,571; Apr. 4, 1966, 41/20,675
Int. Cl. C08g 1/26
U.S. Cl. 260—67    10 Claims This invention relates to a novel process for preparing a thermoplastic polyacetal resin having a high thermal stability and other desirable qualities.

Polyacetal resins, particularly thermoplastic polyacetal resins which can be used as raw materials for the production of shaped articles have been, in general, heretofore, produced by polymerizing formaldehyde with a polymerization initiator to form a high molecular weight polyoxymethylene and then esterifying or etherifying the terminal hydroxy groups of said polymer to increase the resistance against heat and hydrolysis of the produced polymer.

However, it has previously been considered that in order to obtain a thermoplastic polyacetal resin which can be converted into shaped articles and having good mechanical properties, such as high flexural modulus, high tensile strength and high abrasion resistance, a high molecular weight polyoxymethylene which itself must have high thermal stability and toughness and that a polyoxymethylene which does not have such good properties does not yield, even when esterified or etherified at its terminal hydroxy groups, such products as can be used as raw materials for the production of shaped articles.

Furthermore, it has been considered that in order to produce a high molecular weight polyoxymethylene having the desirable properties mentioned above, the starting formaldehyde must be susbtantially anhydrous and highly purified, material containing 0.5% or less, preferably 0.05% or less of impurities, such as water, formic acid and the like, and that there must be used an initiator that can produce a polymer having the desirable properties mentioned above.

The present inventors have discovered that the use of an organic compound of tetravalent tin as a catalyst for polymerizing formaldehyde enables the production of a high molecular weight polyoxymethylene from impure formaldehyde which has hitherto been considered unusable in such a polymerization, i.e., containing 0.5% to 6.0% of impurities such as water, formic acid, and the like. The thusly obtained polyoxymethylene, notwithstanding the fact that it possesses such undesirable properties when considered by the prior art, can be esterified or etherified to form a resin which is equivalent or superior for producing shaped articles to a resin which has been obtained by prior art methods.

The investigation of a high molecular weight polyoxymethylene was started by Staudinger who produced a high molecular weight eupolyoxymethylene, and since then, much research has been done and reported on the production of a high molecular weight polyoxymethylene which can be used as raw materials for producing shaped articles. However, in all of this research, it has been considered that the high molecular weight polyoxymethylene itself must have the desirable properties as mentioned above. This is clear from the fact that in order to obtain a high molecular weight polyoxymethylene which can be used to produce shaped articles having good mechanical properties such as high flexural modulus, high tensile strength, high abrasion resistance and the like, there has been used, for example, a process for polymerizing formaldehyde in which, as starting formaldehyde, there is used substantially anhydrous, pure formaldehyde (i.e., the water content is less than 0.5%, preferably less than 0.05%) obtained by removing impurities, for example, water, formic acid, methanol, methylal, methylformate, and the like, and that such formaldehyde is subjected to polymerization with special attention (see British Patent Nos. 796,862 and 753,299), and a process in which the thus obtained high molecular weight polyoxymethylene having a high thermal stability, i.e., having an extremely low reaction rate constant of thermal degradation is esterified or etherified at the terminal hydroxy groups to further enhance the resistance to heat and hydrolysis (see British Patent No. 770,717).

As mentioned above, in the prior art, the production of a practically useful plastic composition from polyoxymethylene has required as essential conditions, the preparation of the intermediate high molecular weight and highly thermally stable polyoxymethylene, followed by an end-capping reaction, such as etherification, esterification or other chemical treatment to supplement and/or enhance the thermal stability. Most of the research has been done based on such thinking. Thus, almost all prior proposals for producing a polyacetal resin for the production of shaped articles emphasized as important features, that both the molecular weight and the thermal stability of intermediate polyoxymethylene itself be high, and many patents have been granted on such proposals based on the recognition that such features show technical advancement.

Under prevailing prior art conditions, the inventors' discovery as stated above is quite unexpected and surprising. That is to say, a polymer prepared by polymerizing formaldehyde of water content of above 0.5% (the use of which has previously been considered to be avoided as the starting material), with an organic compound of tetravalent tin is inferior in toughness and physical properties when compared to prior art polymers. Therefore, such a polymer would have been considered by prior technical standards even after esterification or etherification unsuitable for producing shaped articles. Unexpectedly, however, such a polymer can be converted into a resin of superior physical properties, which are equivalent to those of commercially available polyacetal resins of good shapability.

This shows that it is unnecessary to make the molecular weight of polyoxymethylene higher than is required, but it is rather important to control the molecular weight and to allow the polymer to have a suitable molecular weight distribution. A further important matter is that the thermal stability of the polyoxymethylene itself prepared by polymerizing formaldehyde, has no direct relation to the final product and should be considered as having an inseparable relation with the esterifying or etherifying step.

In the present invention, formaldehyde, containing impurities, such as water and others in an amount of from 0.5 to 6.0%, may be employed as the starting material, and it is polymerized in an inert organic solvent with an organic compound of tetravalent tin as a catalyst to be described below. A slurry of this polymerization reaction product may be esterified or etherified with an esterifying or etherifying agent in the presence of an esterifying or etherifying catalyst to form a polyoxymethylene resin for the production of shaped articles. This esterification or etherification reaction is preferably carried out by adding an esterifying or etherifying agent and a catalyst therefor to the above-mentioned slurry of the polymer composition in an amount of from 20 to 200% by weight of the solid polymer and reacting them at a temperature of 120°–180° C.

Furthermore, in the present invention, a polyoxymethylene copolymer may be produced by effecting the abovementioned polymerization in the presence of a comonomer copolymerizable with formaldehyde to form a polyoxymethylene copolymer and esterifying or etherifying this copolymer in the same manner as stated above.

The organic compounds of tetravalent tin used in the present invention are represented by the following general formula:

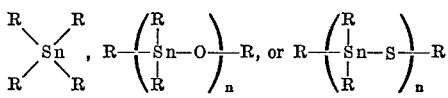

wherein the R groups are defined as follows.

(A) Not more than 3 of the R groups are:

(1) Selected from the group consisting of alkyl, cycloalkyl, aryl, aralkyl and alkenyl groups having 1 to 20 carbon atoms, (2) Selected from the group consisting of alkyl, cycloalkyl, aryl, aralkyl and alkenyl groups having 1 to 20 carbon atoms and said groups substituted by amino, substituted amino, hydroxyl, nitrile, halogen, thiol, carboxyalkyl, epoxy or methylol radical, at least one of said not more than three R groups being the substituted group, or (3) Selected from the group consisting of hydrogen, hydroxyl, thiol and methylol groups, (B) The remaining R groups being either:

(1) Selected from the group consisting of alkyl, cycloalkyl, aryl, aralkyl and alkenyl groups having 1 to 20 carbon atoms and said groups substituted by amino, substituted amino, hydroxyl, nitrile, halogen, thiol, carboxyalkyl, epoxy or methylol radical, each of the groups having further an atomic group consisting of at least two atoms of oxygen, hydrogen, sulphur, carbon and nitrogen, such as carbonyl, thiocarbonyl, oxycarbonyl, amino, amido, sulphoxy and sulphone, through which atomic group said remaining R groups are connected to Sn, or (2) Selected from the group consisting of alkyl, cycloalkyl, aryl, aralkyl and alkenyl groups having 1 to 20 carbon atoms and said groups substituted by amino, substituted amino, hydroxyl, nitrile, halogen, thiol, carboxyalkyl, epoxy or methylol radical, each of the groups having further an oxygen or sulphur atom, through which atom the remaining R groups are connected to Sn in the form of an ether or thioether; and (C):

(1) Any two of the R groups form a ring, and
(2) Two of the R groups may be oxygen or sulphur atoms; and $n$ is an integer above 1.

Examples of the organic compounds of tetravalent tin represented by the above-mentioned general formula are as follows: trimethyltin acetate, di-n-butyltin diacetate, tri-n-butyltin acetate, dimethyltin maleate, di-n-butyltin maleate, di-n-butyltin dilaurate, di-n-butyltin distearate, di-n-butyltin salicylate, diethyltin dibenzoate, diethyltin bis(monolauryl phthalate), di-n-butyltin dicinnamate, di-n-butyltin oxide, di-n-butyltin oxylaurate, di-n-butyltin monomethoxymonoacetate, di-n-butyltin dimethoxide, di-n-butyltin monoacetyl monolauryl mercaptide, di-n-butyltin bis(mono-β-hydroxyethyl maleate), di-n-butyltin bis(monoethyl maleate), di-n-buttyltin monomethoxymethyl maleate, di-n-butyltin dimethacrylate, diethyltin bis(mono-β - hydroxyethylthioglycolate), di-n-butyltin dibutylthioglycolate, di-n-butyltin bisoctylthiopropionate, di-n-butyltin bis-β-chloroethylthioglycolate, di-n-hexyltin bis(tetrahydrofurfuryl)thioglycolate, di-n-butyltin sulphide, di-n-butyltin diepoxyoleate, di-n-butyltin dimethyldithiocarbamate, bis(tri-n-butyltin)oxide, bis(tributyltin)sulphide, polystandiol laurate (tradename: Advastab T-12), polystandiol ether ester (tradename: Advastab T-18, T-900TJ, and so forth).

The high molecular weight polyoxymethylene itself prepared by polymerizing formaldehyde by the action of said organic compound of tetravalent tin is of such inferior quality that it cannot be used for the production of shaped articles. The reason for nevertheless using, in the present invention such an organic compound of tetravalent tin is stated above as a catalyst is as follows: Said catalyst has, unlike prior art catalysts, many desirable characteristics which are described below, and in any event even if the high molecular weight polyoxymethylene itself is inferior for the production of shaped articles, the esterification or etherification of the polymer produces a superior polymer for producing shaped articles, which esterified or etherified polymer is comparable to the resin which is prepared by esterifying or etherifying a high molecular weight polyoxymethylene of superior quality according to a conventional method.

The organic compound of tetravalent tin used in the present invention (referred to as "the present catalyst" hereinafter) is more insensitive to the impurities contained in the starting formaldehyde such as water and others. Therefore, although it has heretofore been thought that the amount of impurity in the starting formaldehyde is critical, and must be less than 0.5%, preferably less than 0.05%, the use of the present catalyst makes it possible to use formaldehyde containing 0.5% to 6.0% of impurities such as water and others to produce a sufficiently high molecular weight polymer. This improvement is most advantageous in industry, because the cost of purifying starting formaldehyde is saved, and the difficulty associated therewith is eliminated.

Conventional organic metal catalysts, for example, alkyl aluminium, alkyl zinc and the like are not practicable because the use of them makes difficult control of the degree of polymerization, but the present catalyst permits control of the degree of polymerization by controlling the amount of the catalyst added without employing any other chain transfer agent, whereby a high molecular weight polyoxymethylene having the desired degree of polymerization can be obtained in accordance with the uses thereof.

In addition, conventional catalysts initiate the polymerization of formaldehyde as soon as the former are added to the latter. Therefore, they have the disadvantage that they cannot be uniformly dispersed into the polymerization system before the initiation of polymerization. However, since the present catalyst has a period of induction of polymerization reaction (about 2 minutes), there is time enough for the catalyst to be uniformly dispersed by stirring or other means. After the catalyst has been uniformly dispersed, the polymerization reaction begins to proceed.

Furthermore, since the present catalyst compound is stable, it is possible to weigh the catalyst exactly when using it, and the recovery thereof after the completion of reaction is simple.

Moreover, when the present catalyst is used, the high molecular weight polyoxymethylene obtained and the esterified or etherified polymer thereof for producing shaped articles both have high degrees of whiteness.

In addition, the present catalyst remains in the polymerization system after the completion of polymerization and is incorporated into, or chemically combined with the high molecular weight polyoxymethylene. This phenomenon can be seen in the prior art where a compound of divalent tin and other organometallic compounds or metal chlorides are used as catalysts. However, these prior art catalysts are insoluble in solvents used for after-treatment of the polyoxymethylene. On the other hand, the present catalyst, which is too firmly incorporated into a polymer to be easily extracted and probably is bonded to the terminal group of the polymer, can be dissolved in an esterifying or etherifying agent under esterifying or etherifying conditions and can thereby be substantially completely removed from the polymer.

The above-mentioned characteristics of the present catalysts make it possible to produce polyoxymethylene for the production of shaped articles by esterifying or etherifying the polymer prepared by using the present catalyst, that is, high molecular weight polyoxymethylene, said polyoxymethylene thus esterified or etherified being sufficiently comparable to the etherification or esterification product of the prior art high quality and high molecular weight polyoxymethylene, even though the polymer itself prepared by using the present catalyst is of inferior quality.

Several methods for the production of high molecular weight polyoxymethylene using organic compounds of divalent tin as catalysts have hitherto been proposed. In these methods, it has been considered indispensable to improve the thermal stability of the polymer, that is, high molecular weight polyoxymethylene itself, and efforts have been made to separate and remove the compound of divalent tin from the produced polymer itself as much as possible. However, as the organic compound of divalent tin is generally insoluble, a specific treatment has been required to remove the compound.

On the contrary, the organic compound of tetravalent tin used in the present invention can easily be dissolved and removed by an esterifying or etherifying agent under esterifying or etherifying conditions as above mentioned, although the catalyst compound is incorporated into or even strongly bonded to the polymer, and therefore, the industrial recovery of the catalyst is remarkably high.

Still further, the organic compound of tetravalent tin used in the present invention is more soluble in an organic solvent such as toluene than is the organic compound of divalent tin, and therefore, the catalyst may be added in the form of a homogeneous solution.

The amount of the organic compound of tetravalent tin used as a catalyst in the present invention varies with the type of said compound, though it may generally be from 0.0001 mol to 1.0 mol, preferably from 0.001 mol to 0.2 mol, per mol of formaldehyde. These compounds may preferably be used dissolved in an inert solvent. In addition, it is one of the great advantages of the present invention that the molecular weight of the polymer obtained can be determined from the proportion of the catalyst to the formaldehyde to be polymerized, and which facilitates control of degree of the polymerization.

In the present invention, polymerization may be carried out either by adding a catalyst to a solution or dispersion of formaldehyde in an inert solvent, or by adding formaldehyde gas, liquefied formaldehyde or a formaldehyde solution to an inert solvent containing a catalyst.

The polymerization reaction is carried out in an inert solvent at a temperature of from $-60°$ C. to $+10°$ C.

As mentioned above, the polymerization reaction is carried out in an inert solvent by adding the above-mentioned organic compound of tetravalent tin as a catalyst to an impure formaldehyde containing from 0.5 to 6.0% of impurities, especially water, formic acid, methanol and the like. In this case, a slurry of a high molecular weight polyoxymethylene having any desired degree of polymerization is prepared by changing the amount of the catalyst added.

According to this polymerization process, the reproduction of the degree of polymerization can be facilitated by the use of the present catalyst, and is not affected by variations in the purity and concentration of formaldehyde. Therefore, said polymerization process is suitable for obtaining a homogeneous polymer. It has now been established that the method known as solution polymerization, which has heretofore been considered unsuitable for obtaining a high molecular weight polyoxymethylene in industry, can be carried out without any difficulty according to the present polymerization process.

When a slurry of polymer is prepared as above, a sample of the polymer which is washed and dried after removal from the slurry is found upon testing to have very low thermal stability, no shape ability or toughness, and is therefore not acceptable on technical grounds for use in preparing shaped articles. The thermal stability is as low as that of a low molecular weight polyoxymethylene, such as paraformaldehyde. If such low thermal stability polyoxymethylene is used for shaping into a film by hot pressing, violent foaming occurs, and the whole of the polymer is sometimes vaporized, leaving no traces. If it is used for shaping into a film by careful treatment with cold rollers, the resulting film is so volatile that after three days at 100° C., no trace remains. On the contrary, when a slurry of the polymer prepared as above is esterified by adding, for example, an acid anhydride directly to the slurry itself, the polymer of inferior quality, can be, at once, converted at a very low cost into a polyacetal resin comparable to the esterification product of a conventional high molecular weight polyoxymethylene, said polyacetal resin being for the production of shaped articles.

Accordingly, in the present invention, to the polymer obtained by polymerizing formaldehyde having impurities in an amount of from 0.5 to 6.0% with a catalyst of the above-mentioned organic compound of tetravalent tin in the presence of an inert solvent, that is, to a slurry of the high molecular weight polyoxymethylene is added 20–500% (by weight) based on the solid component of said polymer of an esterifying or etherifying agent together with an esterifying or etherifying catalyst at 120°–180° C. to carry out the esterification or etherification of the terminal groups. More particularly, said esterification may be effected in the presence of a conventional esterifying agent, such as acetic anhydride and a corresponding esterifying catalyst at an autogeneous pressure above the boiling point of the esterifying agent or under pressure in a closed system. In general, the reaction at 120°180° C., particularly 120°–160° C. gives a favorable result.

The esterifying or etherifying agents include alkali metal alcoholates, phenolates and so forth, which have been found by the present inventors, as well as well-known tertiary amines or alkali metal carboxylates such as sodium acetate.

The etherification may be achieved by reacting an acetal or a ketal of an aldehyde or a ketone as the etherifying agent in the presence of an acidic catalyst at 50°–200° C., more preferably at 100°–170° C. for a period of from several minutes to ten hours.

Detailed explanation thereof is omitted in the present specification, because it is carried out according to well-known methods. Generally, however, methylal, trialkyl orthoesters, dialkoxyalkanes and so forth, are representative, triethyl orthoformate, dimethoxypropane, acetophenone dimethylketal, etc., are particularly useful.

The above reactions at the terminal groups, such as terminal-esterification or terminal-etherification of a high molecular weight polyoxymethylene has previously been carried out by employing an esterifying or etherifying agent in an amount of 10–20 times that of the powdery polymer obtained by separating the polymer from said polymerization system and then washing and drying the polymer. Although, theoretically, the reaction is carried out only at the terminal portion of the polymer, the reaction requires a large amount of an esterifying or etherifying agent. This is because the bulk density of the dried polymer obtained by a solution polymerization process is as low as 0.3–0.1, and unless the esterifying agent is used in an amount more than 10 times that of the polymer, it is quite difficult even to uniformly wet the polymer to be treated. Another reason is that the use of a large amount of the above-mentioned reagent makes it possible to dilute the polymerization catalyst which is incorporated into the polymer, the residue of said catalyst or the catalyst bonded to the polymer and to remove the causes of degradation and discoloration of the polymer and the reactants in esterification or etherification which tend to further weaken the action and adversely affect the light stability and thermal stability of the terminally esterified or etherified polyacetal resin. In the present invention, however, an esterification or etherification agent is added directly to the polymer slurry obtained after the completion of polymerization reaction. Therefore, the polymer produced as such is prone to the action of the esterifying or etherifying agent. Still more, the organic compound of tetravalent tin used in the present invention is, as mentioned above, easily soluble in the esterifying or etherifying agent under the above-mentioned terminal reaction conditions, and said organic compound may be easily removed from said polymer, so that esterification and etherification is sufficiently attained by as small an amount as 20–500% of the esterifying or etherifying agent, based on the total polymer (solid) and almost complete removal of the catalyst is also attained. Thus, a polymer with industrially sufficient thermal stability can be obtained. As mentioned above, and unlike the conventional methods, neither separation of the polymer from the reaction system after completion of polymerization reaction nor washing and drying of said polymer are required. Consequently, the present manner of esterification or etherification, characterized by the very small amount of reagent, permits very economical production of polyacetal resin comparable to prior art polyacetal resins terminally acetylated. Thus, according to the present invention, heretofore expensive polyacetal resin can be prepared at a cost as low as that of other resins which are widely used.

In the present invention, conventional methods are applied with respect to general polymerization operations. Furthermore, the use of the present organic compound of tetravalent tin permits the production of copolymers as well, wherein the general polymerization operations as well as terminal esterifying or etherifying treatment are conducted as in the above-mentioned production of the homopolymer. A series of compounds such as acrylamides and other unsaturated carboxylic amides, substituted aliphatic aldehydes, fluoric aldehydes, ketenes, dialkyl ketenes and the like are typically suitable for comonomers.

The esterified or etherified homopolymer and copolymer of high molecular weight polyoxymethylene obtained by the present invention are optionally mixed with a suitable oxygen stabilizer, light stabilizer, thermal stabilizer, and the like, to form a shaping composition.

EXAMPLE 1

Formaldehyde gas, obtained by heating 200 g. of 95% purity paraformaldehyde at 140°–160° C., was introduced through an inlet pipe maintained at 120° C. into a polymerization vessel maintained at −40° C. by a thermostat. In the vessel, the formaldehyde gas is absorbed into 1500 ml. of a mixture of toluene and n-hexane (1/1 by volume); the concentration of formaldehyde then being 12.6%. When dibutyltin dilaurate was added under stirring a 1% toluene solution, the amount being 0.16 mol percent based on formaldehyde, polymerization started two minutes later and was completed ten minutes later, and a polymer slurry was obtained. A small amount of this slurry was washed with toluene and then with acetone, dried in vacuo at 40° C., and its reduced viscosity was found to be 2.26 [measurement conditions used throughout this specification: weight ratio of p-chlorophenol/tetrachloroethane=1/1 mixture (containing 1% pinene), 60° C., 0.5% concentration], the reaction rate constant for thermal degradation $K_{222}$ was 18.5 (the reaction rate constant at 222° C., percent/min.).

To 1,000 ml. of said polymer slurry having a concentration of 12% solids, 120 ml. of acetic anhydride and 0.12 g. of sodium acetate were added and the mixture was allowed to react in an autoclave for 3 hours at 150° C. Subsequently, the polymer was separated from the slurry, washed with acetone, then with water, and dried at 40° C.; 112 g. of polyacetal resin was obtained. The reduced viscosity of this substance was 2.28, $K_{222}$ was 0.07 and tin was not detected therein.

To this resin, 2.0% of a copolymerized polyamide of hexamethylenediamine, adipic acid and sebacic acid, 0.2% of 4,4' - butylidene(3 - methyl-6-tert.butylphenol) and 0.01% of diphenylamine were admixed and the mixture pelletized. The reaction rate constant for thermal degradation ($K_{222}$) of this pelletized composition was found to be 0.04. The degree of toughness as measured by the method described in British Patents 796,862 and 753,299 was found to be more than 100 cycles. The mechanical properties of the injection moulding sheet of this resin were as follows:

Tensile yield strength (ASTM D–638)
  kg./cm.$^2$__ 693
Tensile yield elongation (ASTM D–638)
  percent__ 14.0
Tensile modulus _____kg./cm.$^2$__ 1.64×10$^4$
Vicat softening point ($D_{1525}$) _____° C__ 171
Melt index _____ 4.75

EXAMPLE 2

Two hundred grams of paraformaldehyde having purity of 99.2% was treated in the same manner as in Example 1 to form a solution in toluene and n-hexane; the concentration was 13.6%. To said solution, 0.015 mol percent of di-n-butyltin dimethoxide based on formaldehyde was added, and polymerized at −40° C. A portion of the slurry obtained after the completion of the polymerization was separated, washed and dried. $K_{222}$ (as defined above) of the polymer thus obtained was 19.3. To 200 parts by weight of the above polymer slurry (solids in polymer being 13%), 26 parts by weight of acetic anhydrous and 1 part of sodium phenolphthalein were added, and the mixture was allowed to react in an autoclave at 150° C. for 3 hours. Subsequently, the polymer was washed with acetone and water, dried to obtain 25 parts by weight of acetylated polymer; $K_{222}$ thereof was 0.03.

To this resin 0.2 part by weight of 2,2-methylenebis(3-methyl - 6 - tert.butylphenol) and 2 parts by weight of dilaurylaminotriazole were admixed and pelletized. Tests on this pelletized composition gave 0.04 for $K_{222}$, 2.40 for reduced viscosity and 4.4 for melt index. It was observed that said pellet had mechanical strength almost equivalent to that of the polymer obtained in Example 1.

EXAMPLE 3

To 100 parts by weight of a slurry of polymer (12% solids) prepared as in Example 2, using polystandiol ester (trade name: Advastab T–900–TJ) as catalyst, 7 parts by weight of a mixture of acetic anhydride and propionic anhydride (weight ratio of about 1:1) and 0.2 part by weight of potassium phenoxide were added. The mixture was reacted in an autoclave at 150° C. for 3 hours. 0.2 part by weight of 2,2' - methylenebis (4 - methyl - 5 - tert.butylphenol) and 2 parts by weight of hydrazide ester polymer synthesized from adipic acid, caprolactone and hydrazine were added to 100 parts by weight of the polymer obtained by the procedure of Example 2 ($K_{222}$=0.05), and pelletized to obtained acetylated polymer having $K_{222}$ of 0.04. The acetylated polymer had a satisfactory thermal stability, luster, and superior mechanical properties almost equivalent to those of Example 2.

EXAMPLE 4

A solution prepared by dissolving acrylamide in acetonitrile was added to toluene. A 2% solution of acrylamide was cooled to −40° C., into which formaldehyde obtained by the heat decomposition of paraformaldehyde having purity of 99.2% was absorbed through a heated introduction pipe to form a formaldehyde solution of 14%. To said solution, 0.01 mol percent of di-n-butyltin-dilaurate was added as a toluene solution, to be polymerized while being stirred. 20 parts by weight of acetic anhydride and 0.01 parts by weight of potassium acetate were added to 100 parts by weight of the slurry thus obtained, and heated at 150° C. for 2 hours. The polymer was separated, and then washed with acetone and water to obtain a copolymer having reduced viscosity of 2.16 in a yield of 96% based on the above-mentioned formaldehyde absorbed. The $K_{222}$ was 0.06, and elemental analysis for N in said copolymer is 1.82%. 2.0% of a polyamide synthesized from hexamethylenediamine and adipic acid, and 0.2% of 4,4'-butylidenebis(4-methyl-6-tert·butylphenol) were added to said copolymer to obtain a molded sheet having tensile strength of 685 kg./cm.$^2$ and tensile modulus of $1.6 \times 10^4$ kg./cm.$^2$.

EXAMPLE 5

Formaldehyde gas obtained by decomposing polyoxymethylene of low degree of polymerization having purity of 99.2% in a paraffin medium at 140°–160° C. was absorbed in a mixed solution of toluene-hexane (the volume ratio being 50:50) to form a solution having concentration of about 12%.

Portions of said solution were introduced into separate reaction vessels, and into each vessel the under-mentioned tin compounds were added as catalysts in the form of toluene solutions in the ratio of 0.01 mol percent based on formaldehyde, after which polymerization reactions were carried out for 30 min. Thereafter about 10% (based on the total amount) of acetic anhydride and 0.01% of sodium acetate were added to each vessel, which was then closed to be heated at 150° C. for 3 hours. Each vessel was then opened and the polymer was separated. The polymer thus separated was washed with acetone and water. 2% of copolymer of polyamide (6–6–10), 0.5% of butylidene-4,4'-bis(2,2'-dimethyl-6,6'-di-tert·butyl)phenol and 0.05% of diphenylamine were added thereto. Finally said mixtures were dried. The results thus obtained are shown in the following table.

EXAMPLE 6

Low molecular weight polyoxymethylene having purity of 99.4% was heat decomposed in a paraffin medium. The resultant obtained thereby was introduced directly through a heated introduction pipe, and absorbed, in a solution prepared by dissolving 0.6 g. of tri-n-butyltin laurate in 1 l. of a solution of toluene and hexane of the ratio of 1:1, at 0° C. ~ −10° C. while stirring and polymerized to form 7% by weight of slurry. 100 g. of acetic anhydride were added to said slurry, and reacted in an autoclave first at 120° C. for 1 hour and then at 150° C. for 2 hours. The solid component of the polymer was then separated from the slurry, and washed with acetone firstly and then with water and dried, 2.5% of polyaminotriazole prepared from sebacic acid dihydrazide, and 0.2% of 2,2'-methylenebis(4-methyl-6-tert·butylphenol) were mixed with said product and after being kneaded were then pelletized.

The reduced viscosity of said pellet was 3.10 and $K_{222}$ value thereof was 0.05%/min. Said pellet could be shaped into a polyacetal resin having sufficient strength, good elasticity and excellent thermostability.

EXAMPLE 7

Low molecular weight polyoxymethylene having purity of 99.3% and formaldehyde obtained by a heat decomposition using dioctylphthalate as heat dispersing medium were blown into a toluene solution of 0.5 g./l. tri-n-butyltin acetate, with stirring and the liquid temperature being maintained between −10° C. to ±2° C. to be polymerized until the solid component concentration reaches 15%. A portion of said polymer was taken out to be washed with acetone and then dried. The polymer thus treated has reduced viscosity of 3.62 and $K_{222}$ of 21.2. This polymer could not be shaped into film or sheet by hot pressing.

600 g. of orthoethylformate was added to 1 l. of the above-mentioned slurry and then 0.5 g. of trifluoroboron etherate was added thereto. The mixture thus obtained was heated at 140° C. for 1 hour and then filtered. The filtrated solid was washed with acetone several times, and further washed in an 0.5% methanol solution of triethylamine for 30 min., and then further washed with acetone and finally dried. The polymer thus obtained was 111 g., and the yield thereof was about 92%. This polymer was hot pressed at 180° C. to be shaped into film. $K_{222}$ of the polymer was 0.05%/min. Toughness as defined above was above 100.

Further, to 25 g. of powder of this polymer, 250 g. of benzyl alcohol containing 0.5% of tributylamine was added. The mixture thus obtained was heated at 160° C. for 30 minutes, dissolved and cooled to obtain a white precipitate. The precipitate was fully washed with acetone and dried to obtain a precipitate. The yield was 95%. The $K_{222}$ thereof was 0.03%/min. The toughness was

| No. | Catalyst | Yield of acetylated polymer | Reduced viscosity | The reaction rate constant for thermal degradation at 222° C. |
|---|---|---|---|---|
| 1 | Di-n-butyltin acetate | 91.2 | 3.26 | 0.04 |
| 2 | Di-n-butyl tin maleate | 90.1 | 2.11 | 0.04 |
| 3 | Di-n-butyltin bis(monoethyl maleate) | 92.1 | 3.51 | 0.04 |
| 4 | Di-n-butyltin dimethacrylate | 91.3 | 3.22 | 0.05 |
| 5 | Di-n-butyltin dibutyl thioglycolate | 92.5 | 3.61 | 0.05 |
| 6 | Diethyltin bis(mono-β-hydroxyethyl thioglycolate) | 93.7 | 3.22 | 0.05 |
| 7 | Diethyltin mercaptide | 92.1 | 3.51 | 0.05 |
| 8 | Dibutyltin oxide | 93.0 | 3.11 | 0.05 |
| 9 | Dibutyltin sulphide | 92.2 | 3.21 | 0.06 |
| 10 | Dibutyltin diepoxy stearate | 93.8 | 3.20 | 0.04 |
| 11 | Di-n-butyltin disalicylate | 93.1 | 3.16 | 0.04 |
| 12 | Di-n-butyltin benzoate | 92.1 | 3.22 | 0.04 |
| 13 | Dibutyltin dimethyldithio-carbamate | 92.3 | 2.61 | 0.04 |
| 14 | Tri-n-butyltin monolaurate | 92.1 | 4.52 | 0.07 |
| 15 | Pyridine | 93.2 | 1.02 | 0.07 |
| 16 | Tri-n-butylamine | 92.1 | 0.91 | 0.05 |
| 17 | Tetraphenyltin (no polymerization ability) | | | |
| 18 | Tetraoctyltin (no polymerization ability) | | | |

Note:

(1) In the above-mentioned results, all the catalysts other than tri-n-butyltin monolaurate completed polymerization almost quantitatively within 10 minutes after the induction period of 122 minutes. The polymerization rate of tri-n-butyltin monolaurate was slightly low, that is, it completed the polymerization 25 minutes later.

(2) The catalysts of No. 8 and 9 are insoluble in toluene, and hence were added in the form of a suspension.

(3) Nos. 15–18 are examples for comparison. It was observed therein that the organic compound of tetravalent tin not within the scope of the catalyst limited in the present invention, for example, tetraphenyltin, tetraoctyltin and the like do not show any polymerizing ability.

over 100. The strength of the sheet 2 mm. thick prepared from this polymer was 700 kg./m.²

EXAMPLE 8

Gaseous formaldehyde obtained by heating a low molecular weight polyoxymethylene of 99.4% purity at 140°–160° C. was introduced, without purification, through a heated inlet pipe, into a polymerization vessel, wherein the formaldehyde gas was absorbed into a toluene solution containing 2% by weight of dimethylketene and 0.05% by weight of di-n-butyltin dilaurate. Then, the polymerization was effected at a temperature between −10° C. and 15° C. Three hours later a polymer slurry containing 10% solid was obtained, which was then acetylated at 150° C. for 3 hours with 12% of acetic anhydride, followed by washing with acetone and water and drying. The thus obtained composition had a reduced viscosity of 2.32 and the $K_{222}$ value thereof was 0.05%/min.

What is claimed is:

1. A process for the preparation of a stabilized polyoxymethylene which comprises polymerizing formaldehyde containing between 0.5–6.0% of impurities in an inert solvent in the presence of a catalyst, said catalyst being an organic compound of tetravalent tin of the general formulae:

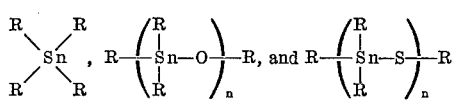

wherein the R groups are defined as follows:
(A) not more than 3 of the R groups are:
  (1) selected from the group consisting of alkyl, cycloalkyl, aryl, aralkyl and alkenyl groups having 1 to 20 carbon atoms,
  (2) selected from the group consisting of alkyl, cycloalkyl, aryl, aralkyl and alkenyl groups having 1 to 20 carbon atoms and said groups substituted by amino, substituted amino, hydroxyl, nitrile, halogen, thiol, carboxyalkyl, epoxy or methylol radical, at least one of said not more than three R groups being the substituted group, or
  (3) selected from the group consisting of hydrogen, hydroxyl, thiol and methylol groups,
(B) the remaining R groups being either:
  (1) selected from the group consisting of alkyl, cycloalkyl, aryl, aralkyl and alkenyl groups having 1 to 20 carbon atoms and said groups substituted by amino, substituted amino, hydroxyl, nitrile, halogen, thiol, carboxyalkyl, epoxy or methylol radical, each of the groups having further an atomic group consisting of at least two atoms of oxygen, hydrogen, sulphur, carbon and nitrogen, such as carbonyl, thiocarbonyl, oxycarbonyl, amino, amido, sulphoxy and sulphone, through which atomic group said remaining R groups are connected to Sn, or
  (2) selected from the group consisting of alkyl, cycloalkyl, aryl, aralkyl and alkenyl groups having 1 to 20 carbon atoms and said groups substituted by amino, substituted amino, hydroxyl, nitrile, halogen, thiol, carboxyalkyl, epoxy or methylol radical, each of the groups having further an oxygen or sulphur atom, through which atom the remaining R groups are connected to Sn in the form of an ether or thioether; and
(C)
  (1) any two of the R groups form a ring, and
  (2) two of the R groups may be oxygen or sulphur atoms; and $n$ is an integer above 1.

whereby a polymer slurry is formed, and reacting said polymer slurry with 20–500% based on the solid of said polymer with an esterifying or etherifying agent in the presence of an esterification or etherification catalyst at a temperature of 120°–180° C.

2. A process as claimed in claim 1 wherein formaldehyde is polymerized at a temperature between −60° C. and +10° C.

3. A process as claimed in claim 1 wherein the molar ratio of organic compound of tetravalent tin to formaldehyde is 0.0001–1.0:1.0.

4. A process as claimed in claim 1 wherein the molar ratio of organic compound of tetravalent tin to formaldehyde is 0.001–0.2:1.0.

5. A process as claimed in claim 1 wherein the esterification or etherification catalyst is selected from the group consisting of alkali metal alcoholates and phenolates.

6. A process for the preparation of a stabilized copolymer of polyoxymethylene which comprises copolymerizing formaldehyde containing 0.5–6.0% of impurities in an inert solvent with a compound selected from the group consisting of unsaturated carboxylic acid amides, fluoric aldehydes, ketenes, and dialkyl ketenes in the presence of a catalyst, said catalyst being an organic compound of tetravalent tin of the general formulae:

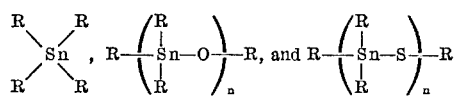

wherein the R groups are defined as follows:
(A) not more than 3 of the R groups are:
  (1) selected from the group consisting of alkyl, cycloalkyl, aryl, aralkyl and alkenyl groups having 1 to 20 carbon atoms,
  (2) selected from the group consisting of alkyl, cycloalkyl, aryl, aralkyl and alkenyl groups having 1 to 20 carbon atoms and said groups substituted by amino, substituted amino, hydroxyl, nitrile, halogen, thiol, carboxyalkyl, epoxy or methylol radical, at least one of said not more than three R groups being the substituted group, or
  (3) selected from the group consisting of hydrogen, hydroxyl, thiol and methylol groups,
(B) the remaining R groups being either:
  (1) selected from the group consisting of alkyl, cycloalkyl, aryl, aralkyl and alkenyl groups having 1 to 20 carbon atoms and said groups substituted by amino, substituted amino, hydroxyl, nitrile, halogen, thiol, carboxyalkyl, epoxy or methylol radical, each of the groups having further an atomic group consisting of at least two atoms of oxygen, hydrogen, sulphur, carbon and nitrogen, such as carbonyl, thiocarbonyl, oxycarbonyl, amino, amido, sulphoxy and sulphone, through said atomic group said remaining R groups are connected to Sn, or
  (2) selected from the group consisting of alkyl, cycloalkyl, aryl, aralkyl and alkenyl groups having 1 to 20 carbon atoms and said groups substituted by amino, substituted amino, hydroxyl, nitrile, halogen, thiol, carboxyalkyl, epoxy or methylol radical, each of the groups having further an oxygen or sulphur atom, through which atom the remaining R groups are connected to Sn in the form of an ether or thioether; and
(C)
  (1) any two of the R groups form a ring, and
  (2) two of the R groups may be oxygen or sulphur atoms; and $n$ is an integer above 1.

whereby a copolymer slurry is formed, reacting said copolymer slurry with 20–500% based on the solid of said copolymer with an esterifying or etherifying agent in the presence of an esterification or etherification catalyst at a temperature of 120°–180° C.

7. A process as claimed in claim 6 wherein formaldehyde is copolymerized at a temperature between −60° C. and +10° C.

8. A process as claimed in claim 6 wherein the molar ratio of organic compound of tetravalent tin to formaldehyde is 0.0001–1.0:1.0.

9. A process as claimed in claim 6 wherein the molar ratio of organic compound of tetravalent tin to formaldehyde is 0.001–0.2:1.0.

10. A process as claimed in claim 6 wherein the esterification or etherification catalyst is selected from the group consisting of alkali metal alcoholates and phenolates.

References Cited

UNITED STATES PATENTS

| | | | |
|---|---|---|---|
| 2,848,437 | 8/1958 | Langsdorf et al. | 260—67 |
| 3,232,906 | 2/1966 | Wagner | 260—67 |
| 3,311,592 | 3/1967 | Wagner et al. | 260—67 |
| 3,376,328 | 4/1968 | Davies | 260—429.7 |

FOREIGN PATENTS 1,300,492  6/1962  France.

WILLIAM H. SHORT, Primary Examiner

L. M. PHYNES, Assistant Examiner

U.S. Cl. X.R.

260—64, 72